United States Patent
Journade et al.

(10) Patent No.: US 10,183,756 B2
(45) Date of Patent: Jan. 22, 2019

(54) AIRCRAFT ENGINE MOUNT COMPRISING AT LEAST ONE TRANSVERSE NUT AND AIRCRAFT COMPRISING THE SAID ENGINE MOUNT

(71) Applicant: Airbus Operations SAS, Toulouse (FR)

(72) Inventors: Frederic Journade, Toulouse (FR); Eric Bouchet, Aussonne (FR); Nicolas Grosseau, Frouzins (FR); Antoine Mutin, Aussonne (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 15/641,771

(22) Filed: Jul. 5, 2017

(65) Prior Publication Data
US 2018/0009543 A1  Jan. 11, 2018

(30) Foreign Application Priority Data
Jul. 8, 2016 (FR) .................... 16 56590

(51) Int. Cl.
*B64D 27/26* (2006.01)
*F16B 37/04* (2006.01)

(52) U.S. Cl.
CPC ............ *B64D 27/26* (2013.01); *F16B 37/047* (2013.01); *B64D 2027/266* (2013.01)

(58) Field of Classification Search
CPC ............ B64D 27/26; B64D 2027/262; B64D 2027/266; F02C 7/20; F16B 37/047
See application file for complete search history.

(56) References Cited

U.S. PATENT DOCUMENTS

| | | | |
|---|---|---|---|
| 2,903,035 A | 9/1959 | Davenport et al. | |
| 4,068,958 A * | 1/1978 | Beckershoff | F16B 37/047 403/384 |
| 5,032,047 A * | 7/1991 | Theakston | F16B 37/047 411/104 |
| 5,037,258 A * | 8/1991 | Heurteux | F16B 37/047 411/104 |
| 5,238,206 A | 8/1993 | Pachomoff | |
| 6,173,919 B1 | 1/2001 | Le Blaye | |

(Continued)

FOREIGN PATENT DOCUMENTS

| | | |
|---|---|---|
| EP | 0527672 | 2/1993 |
| EP | 0934877 | 8/1999 |

(Continued)

OTHER PUBLICATIONS

French Search Report, dated Feb. 28, 2017, priority document.

*Primary Examiner* — Joseph W Sanderson
(74) *Attorney, Agent, or Firm* — Greer, Burns & Crain, Ltd.

(57) ABSTRACT

An aircraft engine mount which comprises first and second parts connected by connecting elements and wherein one of the two connected parts comprises at least one transverse hole opening onto an access face of the part and into which there open at least two passage holes each intended to house a threaded shank of one of the connecting elements. The engine mount comprises a transverse nut which comprises at least two bodies joined together each having a tapped hole configured to engage with one of the threaded shanks.

16 Claims, 2 Drawing Sheets

(56) References Cited

U.S. PATENT DOCUMENTS

| | | | | |
|---|---|---|---|---|
| 6,986,482 B2* | 1/2006 | Brefort | ............... | B64D 27/18 |
| | | | | 244/54 |
| 7,891,604 B2* | 2/2011 | Combes | ............... | B64D 27/26 |
| | | | | 244/54 |
| 8,074,923 B2* | 12/2011 | Foster | ............... | B64D 27/26 |
| | | | | 244/54 |
| 8,186,618 B2* | 5/2012 | Beaufort | ............... | B64D 27/26 |
| | | | | 244/54 |
| 8,413,925 B2* | 4/2013 | Martinou | ............... | B64D 27/26 |
| | | | | 244/54 |
| 9,759,251 B2* | 9/2017 | Stanescu | ............... | B23G 9/006 |
| 2002/0076299 A1* | 6/2002 | Ransil | ............... | F16B 37/047 |
| | | | | 411/84 |
| 2004/0094680 A1* | 5/2004 | Brefort | ............... | B64D 27/18 |
| | | | | 248/230.1 |
| 2008/0197233 A1* | 8/2008 | Combes | ............... | B64D 27/26 |
| | | | | 244/54 |
| 2009/0200418 A1* | 8/2009 | Beaufort | ............... | B64D 27/26 |
| | | | | 244/54 |
| 2009/0266933 A1* | 10/2009 | Foster | ............... | B64D 27/26 |
| | | | | 244/54 |
| 2009/0285652 A1 | 11/2009 | Williams | | |
| 2010/0147997 A1 | 6/2010 | Martinou et al. | | |
| 2015/0354616 A1 | 12/2015 | Dimelow et al. | | |
| 2016/0061250 A1* | 3/2016 | Stanescu | ............... | B23G 9/006 |
| | | | | 411/427 |

FOREIGN PATENT DOCUMENTS

| | | |
|---|---|---|
| EP | 2952753 | 12/2015 |
| FR | 2915176 | 10/2008 |

* cited by examiner

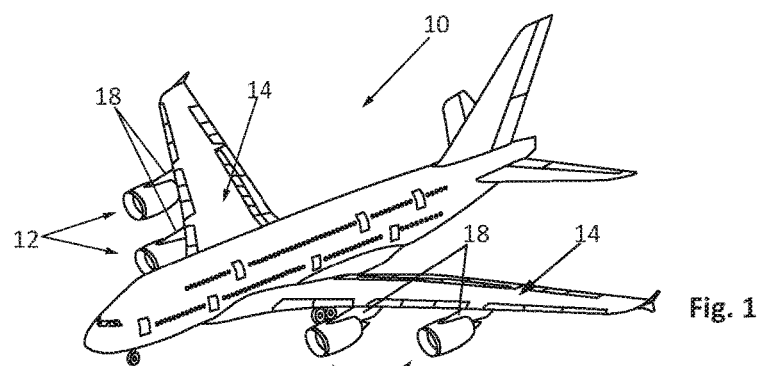
Fig. 1
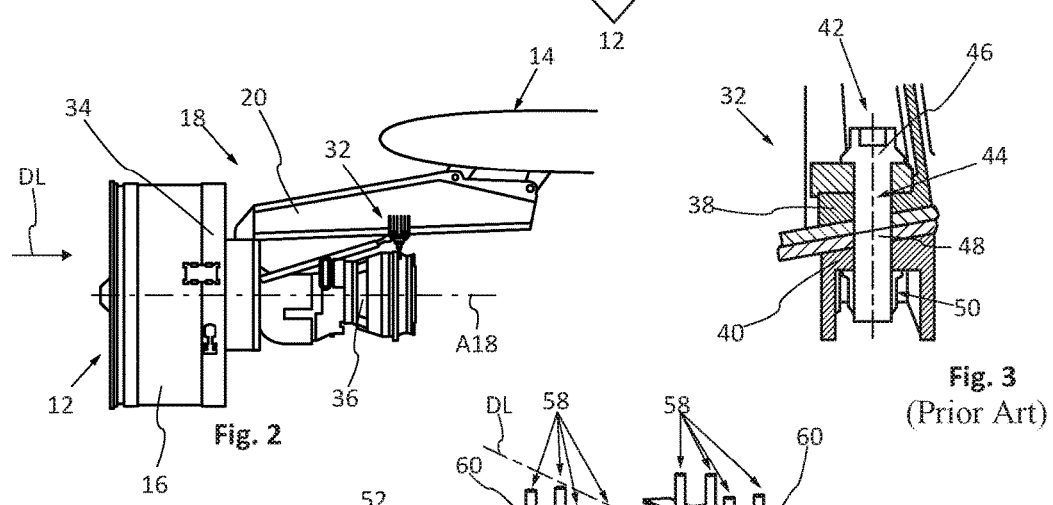
Fig. 2
Fig. 3 (Prior Art)
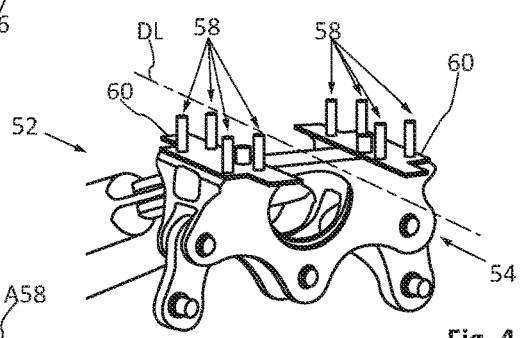
Fig. 4
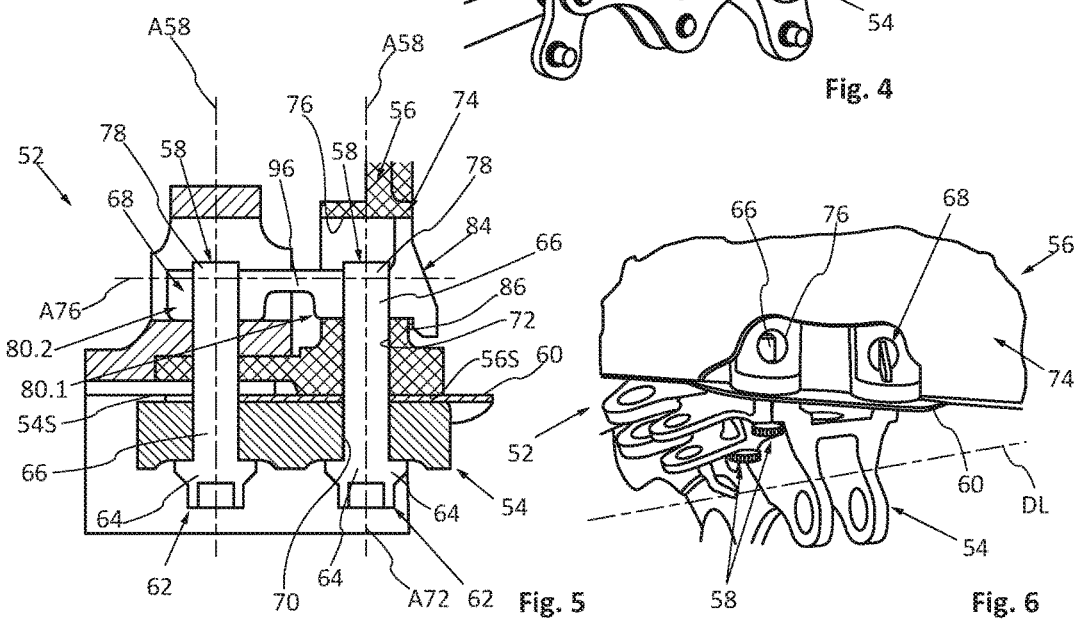
Fig. 5
Fig. 6

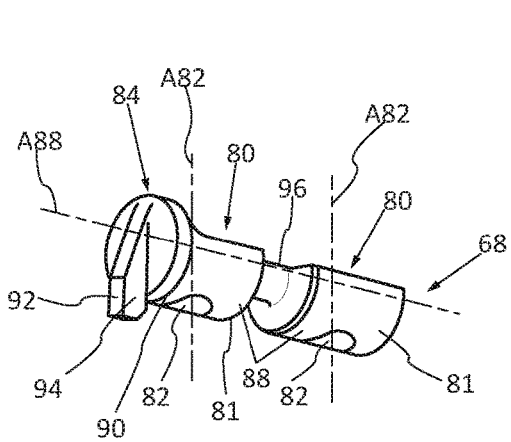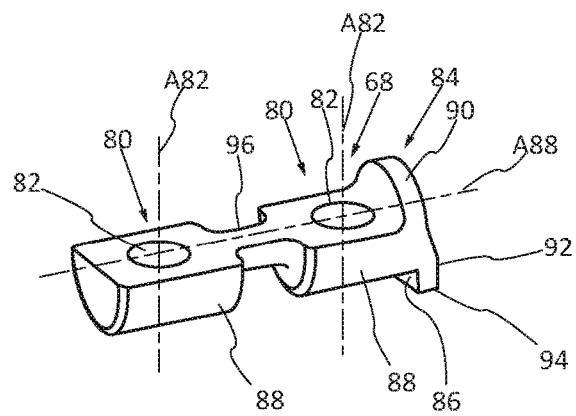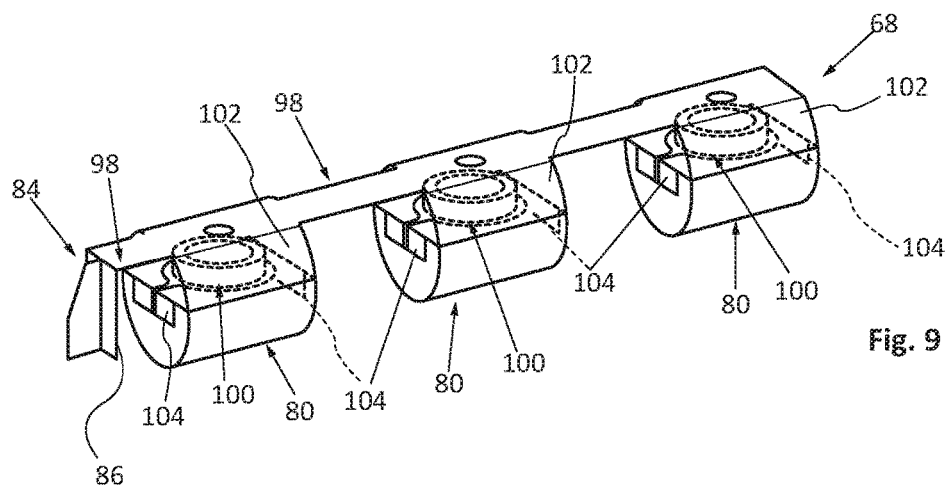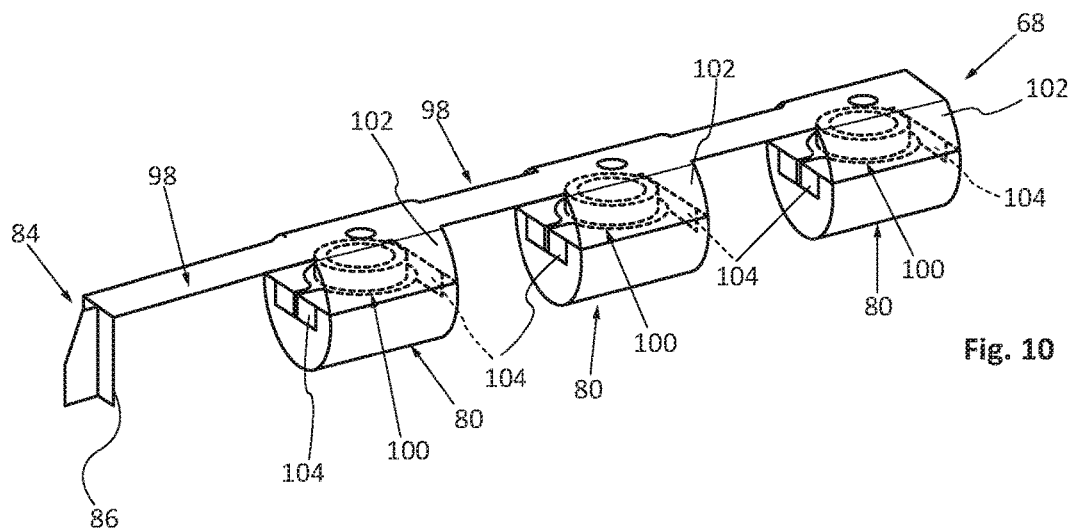

AIRCRAFT ENGINE MOUNT COMPRISING AT LEAST ONE TRANSVERSE NUT AND AIRCRAFT COMPRISING THE SAID ENGINE MOUNT

CROSS-REFERENCES TO RELATED APPLICATIONS

This application claims the benefit of the French patent application No. 1656590 filed on Jul. 8, 2016, the entire disclosures of which are incorporated herein by way of reference.

BACKGROUND OF THE INVENTION

The present invention relates to an aircraft engine mount comprising at least one transverse nut and to an aircraft comprising the engine mount.

According to a configuration visible in FIGS. 1 and 2, an aircraft 10 comprises several engine assemblies 12 which are positioned under the wing structure 14 of the aircraft 10 and which each comprise an engine 16 connected to the wing structure 14 by a pylon 18.

The pylon 18 comprises a rigid primary structure 20 which among other things transmits load between the engine 16 and the rest of the aircraft 10, and a secondary structure which envelops the primary structure 20 and limits the drag of the pylon.

Throughout the description, a longitudinal direction DL is a direction substantially parallel to the engine axis A18. A transverse direction is a direction substantially parallel to the axis of the wing structure 14. The notions of top and bottom refer to the connections between the pylon and the rest of the aircraft, the top corresponding to the connection between the pylon and the wing structure of the aircraft and the bottom corresponding to the connection between the pylon and the engine.

The primary structure 20 of the pylon 18 is connected to the engine 16 by a connection which comprises a rear engine mount 32, a front engine mount 34 and a pair of thrust rods 36 which react thrust load.

According to an embodiment visible in FIG. 3, the rear engine mount 32 comprises a first mounting plate 38 secured to the primary structure 20 of the pylon 18, a second mounting plate 40 secured to the engine 16 and connecting elements 42, each mounting plate 38, 40 comprising a passage orifice for each connecting element 42.

Each connecting element 42 is a bolt which comprises, on the one hand, a screw 44 with a head 46 which bears against one of the mounting plates 38, 40 (or against a washer in contact with one of the mounting plates) and a threaded shank 48 which passes through the passage orifices, and, on the other hand, a nut 50 which screws onto the threaded shank 48 and which bears against the other mounting plate 38, 40 (or against a washer in contact with the other mounting plate).

According to this embodiment, for each connecting element, the two zones located in the continuation of the threaded shank 48 need to be kept clear in order to access the screw head and the nut and to tighten them. Having to provide this access for the primary structure 20 of the pylon 18 therefore introduces an additional constraint into the design thereof, this generally being one that is penalizing in terms of compactness.

The present invention seeks to overcome the disadvantages of the prior art.

SUMMARY OF THE INVENTION

To this end, a subject of the invention is an aircraft engine assembly connecting an engine to a pylon and comprising:

a first part secured to or forming part of a first of the elements that are the engine and the pylon, a second part secured to or forming part of a second of the elements that are the engine and the pylon, connecting elements each of which comprises a screw which comprises a head configured to bear against the first part in operation and a threaded shank, the first and second parts each comprising a passage hole for each connecting element.

The engine assembly is characterized in that the second part comprises at least one transverse hole opening onto an access face of the second part and into which there open at least two passage orifices, and in that a nut configured to engage with one of the threaded shanks, is a transverse nut which comprises at least two bodies joined together and which each comprise a tapped hole configured to be screwed onto one of the threaded shanks, the tapped holes of the nut having axes that substantially coincide with axes of the passage orifices in operation.

According to the invention, the nut is fitted into the transverse hole from a zone situated outside the primary structure from an access face and need no longer be maintained at the time of tightening.

According to another feature, the nut at one of its ends comprises a head which is connected to the body.

According to other features, this head comprises:

a thrust surface configured to bear against the access face in operation, and/or a cylindrical portion with a diameter substantially equal to that of the transverse hole, and/or a wing with two faces parallel to the axes of the tapped holes, the wing being configured to allow the nut to be grasped.

Advantageously, the wing comprises an extension projecting from the cylindrical bearing surface of the head, the extension being configured to bear against the access face in operation.

According to a first alternative form, the nut comprises at least one spacer piece configured to connect two bodies, the bodies and the spacer piece or pieces being produced as a single piece.

According to another alternative form, the nut comprises a support which comprises at least two housings each configured to accept a body. For preference, the support comprises a head with a thrust surface configured to bear against the access face in operation.

BRIEF DESCRIPTION OF THE DRAWINGS

Further features and advantages will become apparent from the following description of the invention, which description is given purely by way of example, with reference to the attached drawings in which:

FIG. 1 is a perspective view of an aircraft,

FIG. 2 is a lateral view of an engine assembly and of a pylon without the streamlining elements, FIG. 3 is a cross section of part of an engine mount illustrating the prior art, FIG. 4 is a perspective view of part of an engine mount illustrating one embodiment of the invention, FIG. 5 is a partial cross section of an engine mount illustrating one embodiment of the invention, FIG. 6 is a perspective view of an engine mount illustrating one embodiment of the invention, FIGS. 7 and 8 are perspective views, from two viewpoints, of a transverse nut which illustrate one embodiment of the invention, FIG. 9 is a perspective view of a transverse nut illustrating another embodiment of the invention, FIG. 10 is a perspective view of a transverse nut illustrating another embodiment of the invention.

DETAILED DESCRIPTION OF THE PREFERRED EMBODIMENTS

FIGS. 4 to 6 depict a rear engine mount 52 configured to connect an engine to a primary structure of an aircraft pylon.

The rear engine mount 52 comprises a first part 54 which corresponds to a part of the engine or which is secured to the engine, a second part 56 (visible in FIGS. 5 and 6) which corresponds to part of the primary structure or which is secured to the primary structure, and connecting elements 58 connecting the first and second parts 54 and 56.

As an alternative, the first part 54 corresponds to part of the primary structure or is secured to the primary structure and the second part 56 corresponds to part of the engine or is secured to the engine.

The first and second parts 54 and 56 respectively comprise first and second contact surfaces 54S and 56S oriented towards one another, in contact with one another or alternatively separated by an intermediary component 60.

For each connecting element 58, the first and second parts 54 and 56 respectively comprise passage orifices 70 and 72. Each connecting element 58 comprises a screw 62 which comprises a head 64 configured to bear directly or indirectly against the first part 54 and a threaded shank 66.

According to a configuration visible in FIGS. 4 and 5, the rear mount 52 comprises four series of two connecting elements 58, each aligned in a direction substantially perpendicular to the longitudinal direction. For each series, the threaded shanks of the connecting elements 58 (visible in FIG. 5) have axes that are parallel and vertical.

Whatever the configuration, the rear mount 52 comprises at least two connecting elements 58 which have axes A58 which are parallel and arranged in one and the same plane.

Whatever the embodiment, the second part 56 comprises an access face 74 substantially parallel to the axes A58 of the connecting elements 58. The access face 74 corresponds to a surface separating the inside and the outside of the second part 56.

According to one feature of the invention, the second part 56 comprises at least one cylindrical transverse hole 76, distant from the contact surface 56S, and into which at least two passage orifices 72 of the second part 56 open. This transverse hole 76 opens onto the access face 74. According to one configuration, this transverse hole 76 has a diameter and is positioned such that once the connecting elements 58 have been tightened, the ends 78 of the threaded shanks 66 are positioned in the transverse hole 76, preferably slightly above the axis A76 of the transverse hole 76.

According to one embodiment, the transverse hole 76 has an axis A76 that is secant with and substantially perpendicular to the axes A72 of the passage orifices 72, the axis A76 being parallel to the transverse direction.

According to one feature of the invention, the rear engine mount 52 comprises at least one nut 68 to collaborate with the threaded shank 66 of one of the connecting elements 58. Such a nut is transverse and comprises at least two bodies 80 joined together. Each body 80 comprises a tapped hole 82 configured to allow the threaded shank 66 of one of the connecting elements 58 to be screwed into it. The tapped holes 82 of one and the same nut 68 have axes A82 which are parallel and which substantially coincide with the axes A72 of the passage orifices 72 in which are housed the threaded shanks 66 of the connecting elements 58 which engage with the nut 68.

The bodies 80 of one and the same nut 68 are not necessarily all identical. According to one embodiment visible in FIG. 5, the body 80.2 furthest away from the access face 74 may be smaller than the body 80.1 closest to the access face 74, for example to make the nut 68 easier to insert into the transverse hole 76. In addition, the bodies 80 of one and the same nut 68 may be sized differently because they may be loaded differently.

According to this feature, the nut 68 is held in place in the transverse hole 76 from the access face 74 and the tightening of the connecting elements 58 is performed only by acting on the heads 64 of the screws 62 without the need to hold the nut 68. As a consequence, in the case of a primary structure of a pylon, the zone in the continuation of the threaded shank 66 no longer needs to be clear and accessible. The nut 68 is fitted from a zone situated on the outside of the primary structure and no longer needs to be held during tightening. Specifically, since the bodies 80 of the nut are connected, it is impossible for them to rotate when the screws 62 of the connecting elements 58 are being screwed in.

For preference, the rear mount 52 comprises several series of aligned connecting elements 58. In that case, the nut 68 comprises as many bodies 80 as the series has connecting elements 58.

According to one embodiment visible in FIGS. 5, 7 and 8, the nut 68 comprises at least one spacer piece 96 which connects two bodies 80, the two bodies 80 and the spacer piece 96 being produced as a single piece and forming just one single component. For preference, all the bodies 80 of a nut 68 are which connects in pairs by spacer pieces 96, the bodies 80 and the spacer pieces 96 being produced as a single piece and forming just one single component.

According to one embodiment, each body 80 is a half-cylinder 88 with a diameter smaller than or equal to the diameter of the transverse hole 76 and an axis A88 perpendicular to the axis A82 of the tapped hole. This embodiment makes it possible to reduce the mass of the nut 68.

According to another embodiment visible in FIG. 9, the nut 68 comprises a support 98 configured to hold several bodies 80. For each body 80, the support 98 comprises a housing 100 into which one of the bodies 80 fits, the housing 100 being configured to immobilize the body 80 when the assembly formed by the support 98 and the bodies 80 is introduced into the transverse hole 76. For that purpose, each body 80 is half-cylindrical and, for each body 80, the support 98 comprises a half-cylindrical portion 102 complementing the half-cylindrical shape of the body 80 and two thrust surfaces 104 positioned one on each side of the body 80 and configured to immobilize the body 80 in a direction parallel to the axis A76 of the transverse hole 76 in operation. According to this embodiment, the half-cylindrical portion 102 and the two thrust surfaces 104 form a housing 100 configured to accept a body 80.

For preference, the bodies 80 are made of metal and the support 98 is made of metal, of plastic or of composite material.

According to another feature, the nut at one of its ends comprises a head 84 which is connected to one of the bodies 80 and which comprises a thrust surface 86 configured to bear against the access face 74 in operation. The distance between the axis A82 of the tapped hole 82 closest to the head 84 and the thrust surface 86 is equal to the distance between the axis A72 of the passage hole 72 closest to the access face 74 and the access face 74 of the second part 56. This arrangement makes it easier to position the tapped hole 82 with respect to the threaded shank 66.

Advantageously, the head 84 comprises a cylindrical portion 90 with a diameter substantially equal to that of the transverse hole 76 and a length (dimension in the transverse direction) that is reduced, on the order of 3 to 10 mm. The cylindrical portion 90 which has a diameter equal to that of the transverse hole 76 prevents any translational movement of the nut 68 in a plane perpendicular to the axis A76 of the transverse hole 76. This configuration makes it easier to screw the threaded shank 66 into the nut 68.

For preference, the head is positioned with respect to the bodies 80 in such a way that in operation, the cylindrical portion 90 lies flush with the access face 74 and closes off the transverse hole 76 as illustrated in FIG. 6.

According to one embodiment, the head 84 comprises a positioning means.

According to an alternative form, the positioning means comprises a wing 92 with a thickness on the order of 4 to 10 mm In operation, the wing 92 remains as a projection with respect to the access face 74, on the outside of the primary structure 20. This wing 92 is configured to allow an operator to grasp the nut 68 and to make it easier to introduce this nut into the transverse hole 76.

The wing 92 also serves to indicate the position of the head 84, making it possible to confirm that the axis of the nut 68 is substantially perpendicular to the axes of the threaded shanks 66.

Advantageously, the faces of the wing 92 are parallel to the axes A82 of the tapped holes 82. This configuration allows an operator to orientate the rotation of the nut 68 in the transverse hole 76 so as to position it correctly so that the tapped holes 82 are aligned with the threaded shanks 66.

The wing 92 comprises an extension 94 which comprises an edge face parallel to the axes A82 of the tapped holes 82 which forms the thrust surface 86. In operation, the extension 94 is oriented towards the first part 54. This extension 94 also contributes to making the nut 68 easier to orientate in the transverse hole 76.

According to another alternative form, the positioning means may equally well be a slot (not depicted) into which a turning tool (such as a screwdriver) can be introduced in order to adjust the alignment of the nut 68.

According to embodiments visible in FIGS. 5 to 8, the head 84 and the bodies 80 of the nut 68 are made as a single piece and form a single component.

According to other embodiments visible in FIG. 9, the head 84 and the support 98 are produced as a single piece and form a single component.

According to embodiments visible in FIGS. 5 to 8, the head 84 is contiguous with or integrated into one of the bodies 80.

According to other embodiments visible in FIGS. 9 and 10, the head 84 is distant from the bodies 80. The distance between the head 84 and the nearest body 80 may vary from one nut 68 to another so as to adapt to suit the geometry of the engine mount. By way of example, the distance separating the head 84 and the nearest body 80 for the nut 68 visible in FIG. 9 is less than that for the nut 68 visible in FIG. 10.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft engine assembly connecting an engine to a pylon and comprising:
   a first part secured to or forming part of a first of the elements that are the engine and the pylon,
   a second part secured to or forming part of a second of the elements that are the engine and the pylon, wherein when one of the first part and the second part is secured to the engine or the pylon, the other of the first part and the second part is formed by the engine or the pylon,
   at least two connecting elements each of which comprises a screw which comprises a head configured to bear against the first part in operation and a threaded shank,
      the first and second parts each comprising a passage orifice for each of the at least two connecting elements,
      the second part comprising at least one transverse hole opening onto an access face of the second part and into which there open at least two passage orifices, and
   a nut configured to engage with one of the threaded shanks, the nut comprising a transverse nut which comprises at least two bodies joined together and which each comprise a tapped hole, the tapped holes of the nut having axes that substantially coincide with axes of the passage orifices in operation,
   wherein the nut comprises a head at an end, and,
   wherein the head comprises a wing configured to allow the nut to be grasped, the wing comprising an extension which projects beyond the access face of the second part and which comprises an edge face extending parallel to the axes of the tapped holes.

2. The aircraft engine assembly according to claim 1, wherein the head is connected to one of the bodies of the at least two bodies.

3. The aircraft engine assembly according to claim 1, wherein the head of the nut comprises a thrust surface configured to bear against the access face in operation.

4. The aircraft engine assembly according to claim wherein the head of the nut comprises a cylindrical portion with a diameter substantially equal to that of the transverse hole.

5. The aircraft engine assembly according to claim 1, wherein the extension forms a thrust surface bearing against the access face in operation.

6. The aircraft engine assembly according to claim 1, wherein the nut comprises at least one spacer piece configured to connect two bodies of the at least two bodies, the bodies and the at least one spacer piece or pieces being produced as a single piece.

7. The aircraft engine assembly according to claim 1, wherein the nut comprises a support which comprises at least two housings each configured to accept a body of the at least two bodies.

8. The aircraft engine assembly according to claim 7, wherein the support comprises the head and wherein the head forms a thrust surface configured to bear against the access face in operation.

9. An aircraft engine assembly connecting an engine to a pylon and comprising:
- a first part secured to or forming part of a first of the elements that are the engine and the pylon,
- a second part secured to or forming part of a second of the elements that are the engine and the pylon, wherein when one of the first part and the second part is secured to the engine or the pylon, the other of the first part and the second part is formed by the engine or the pylon,
- connecting elements each of which comprises a screw which comprises a head configured to bear against the first part in operation and a threaded shank,
  - the first and second parts each comprising a passage orifice for each connecting element,
  - the second part comprising at least one transverse hole opening onto an access face of the second part and into which there open at least two passage orifices, and
- a nut configured to engage with one of the threaded shanks, the nut comprising a transverse nut which comprises at least two bodies joined together and which each comprise a tapped hole, the tapped holes of the nut having axes that substantially coincide with axes of the passage orifices in operation, wherein the nut comprises a support which comprises at least two housings each configured to accept a body of the at least two bodies.

10. The aircraft engine assembly according to claim 9, wherein the support comprises a head with a thrust surface configured to bear against the access face in operation.

11. The aircraft engine assembly according to claim 9, wherein the nut at one of its ends comprises a head connected to one of the bodies of the at least two bodies.

12. The aircraft engine assembly according to claim 11, wherein the head of the nut comprises a thrust surface configured to bear against the access face in operation.

13. The aircraft engine assembly according to claim 11, wherein the head of the nut comprises a cylindrical portion with a diameter substantially equal to that of the transverse hole.

14. The aircraft engine assembly according to claim 11, wherein the head comprises a wing configured to allow the nut to be grasped, the wing comprising an extension which projects beyond the access face of the second part and which comprises an edge face extending parallel to the axes of the tapped holes.

15. The aircraft engine assembly according to claim 14, wherein the extension forms a thrust surface bearing against the access face in operation.

16. The aircraft engine assembly according to claim 9, wherein the nut comprises at least one spacer piece configured to connect two bodies of the at least two bodies, the bodies and the at least one spacer piece or pieces being produced as a single piece.

* * * * *